US008239955B2

(12) United States Patent
Haustein et al.

(10) Patent No.: US 8,239,955 B2
(45) Date of Patent: Aug. 7, 2012

(54) SYSTEM AND METHOD FOR ADJUSTING THE SECURITY LEVEL OF A REMOVABLE MEDIUM

(75) Inventors: Nils Haustein, Soergenloch (DE); Craig A. Klein, Tucson, AZ (US); Frank Krick, Ockenheim (DE); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1151 days.

(21) Appl. No.: 12/059,772

(22) Filed: Mar. 31, 2008

(65) Prior Publication Data

US 2009/0249474 A1 Oct. 1, 2009

(51) Int. Cl.
*G06F 21/00* (2006.01)

(52) U.S. Cl. .................. 726/26; 726/2; 726/16; 726/27; 726/30; 711/163; 713/166; 713/193

(58) Field of Classification Search .................. 711/163; 726/2, 16, 26–28; 713/166, 193
See application file for complete search history.

(56) References Cited

U.S. PATENT DOCUMENTS

| 6,643,777 | B1* | 11/2003 | Chu ................................. 726/16 |
| 6,889,210 | B1* | 5/2005 | Vainstein ......................... 705/57 |
| 6,963,980 | B1* | 11/2005 | Mattsson ....................... 713/194 |
| 7,322,047 | B2 | 1/2008 | Redlich et al. |
| 2004/0172394 | A1* | 9/2004 | Smolsky ........................... 707/6 |

FOREIGN PATENT DOCUMENTS

| WO | WO 2005081086 | 9/2005 |
| WO | WO 2007099012 | 9/2007 |

* cited by examiner

*Primary Examiner* — Peter Poltorak
*Assistant Examiner* — Imhotep Durham
(74) *Attorney, Agent, or Firm* — McGinn IP Law Group, PLLC

(57) ABSTRACT

A method of adjusting a security level of a removable medium, including receiving a unique identification (ID) of a removable medium, a name of a file being processed, and a requested operation, determining the security level of the removable medium, determining a security level of the file being processed, and one of increasing and decreasing the security level of the removable medium based on the determined security level of the file being processed. Further, security levels of removable media are mapped to security zones which are subsequently used to allow or prevent transportation of a removable medium inside or outside of certain boundaries.

1 Claim, 4 Drawing Sheets

SYSTEM AND METHOD FOR ADJUSTING THE SECURITY LEVEL OF A REMOVABLE MEDIUM

BACKGROUND OF THE INVENTION

1. Field of the Invention

The present invention relates to removable media having a removable media passport and more precisely to a system and method that automatically adjusts the security level of a removable medium based on the security level of a file being processed (e.g. a file being written to or deleted from the medium.)

2. Description of the Related Art

Removable media, such as removable disk, tape, optical or flash memory, have the intrinsic capability to be transported within and beyond a boundary. This has advantages because data can be transported from one stationary computer system to another. But it is also an increasing threat for enterprises because removable media also allows one to a) steal data and b) introduce undesired data such as viruses.

Current security technologies exist to prevent removable media from being taken outside of an established boundary. Such technology is for example based on video surveillance or other scanning techniques like X-Ray. Often, the carrier has to intentionally take out the removable medium out of a carrying device such as a briefcase or a pocket, and place the removable medium into the hardware for information retrieval. This process is cumbersome and time-consuming, especially if the carrier is already carrying other items. Also, in the case when the carrier intentionally conceals the removable medium and attempts to carry the removable medium outside of a room or building without permission, detection of the removable medium is impossible without his or her consent. In this case, the carrier may easily smuggle the removable medium out of a secured room or building, for example, by concealing the removable medium in his or her pocket.

Personal identification cards also exist where a person inserts a card before entering or exiting a room or building. However, the detection device for these identification cards do not detect whether the person is carrying any removable medium without permission.

Further, conventional security devices consist of local, stand-alone devices for detecting items being smuggled into or out of a boundary. For example, in shops such security devices are installed at the door to alert the seller if someone smuggles an item inside or outside the shop. These devices might be based on Radio Frequency Identification (RFID) where the items have an RFID transponder attached and the security device installed at the door includes a corresponding RFID reader. If an item with said RFID transponder passes the RFID reader included in the security device the security device might send an alert.

To date, conventional security technology lacks a central control and tracking system for establishing and determining where removable media may be carried within an enclosure. Thus each security device has to be programmed individually and there is no central control system. In addition traditional security devices installed in shops work in a "all-or-nothing" mode where they send an alert for all items or none, but not for subsets of items.

In addition conventional security technologies do not consider the confidentiality of information stored on a removable medium. Thus even a removable medium with no data or less important information stored on it might be treated based on preconfigured rules. The disadvantage is that operational processes requiring the transportation of removable media inside or outside a boundary might prevent the transportation of a removable medium, even though it is empty. In addition security alerts might be sent to administrators and security officers which are not necessary because there is no security violation because the removable medium is empty or has less important information stored on it. Likewise if important or confidential information is stored on a removable medium it might be allowed to be transported even though this might cause data to become stolen.

Thus a system and method is required which automatically adjusts the security level of a removable medium based on the importance and confidentiality of the data stored on it.

SUMMARY OF THE INVENTION

Therefore, a system and method is required allowing or preventing the presence of removable media in certain boundaries—such as offices and data centers—based on the importance of the data stored on the medium which might be expressed by a security level.

This invention teaches a system and method that adjusts the security level of a removable medium based on the security level of a data (such as files) being processed (e.g. a file that is being written to or deleted from the medium). The security level of data is defined by the user and configured within an inventive security server system. Therefore, data may be classified as three security levels: critical, important and uncritical.

When referring to data the easiest way to describe it is by a file containing data in form of bits and bytes. A file is denoted by a file name and other attributes such as the file creater's name, date and time of the file's creation and modification, and file type. However, the term describing the data may also refer to collections of files such as directories or file systems. The term may also refer to data that is not stored in a file but in data sets pertaining to a database.

The security level of a removable medium of the present invention is directly derived from the security level of the data. More precisely, the removable medium automatically obtains the highest security level of all data stored on it. The security level of the removable medium is further adjusted whenever data is written to the removable medium or deleted from the removable medium according to the inventive process. For example, if critical data is stored on a removable medium which previously contained uncritical data then the security level of that medium is increased to critical.

The security level associated with a removable medium and derived from the data stored on it can be used to allow or prevent access to certain rooms, buildings or other geographic boundary where the medium can be transported. If a removable medium is transported inside or outside an allowed boundary the inventive system can be configured to send alarms of different kinds including visible, auditable and electronic signals. Alternatively, the inventive system can prevent to unlock a door in order to prevent the medium from being transported outside a certain boundary. For example, if the security level of a removable medium is increased from uncritical to critical it cannot be transported into or outside of certain boundaries, e.g. computer room.

This invention is based on the removable medium passport, where each removable medium has a radio frequency identification (RFID) transponder containing a unique identification (ID), RFID readers that are added within a building or computer center marking certain boundaries, and a security server that associates the security level with boundaries and sends alerts if a removable medium is transported outside a boundary it is allowed to be located.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
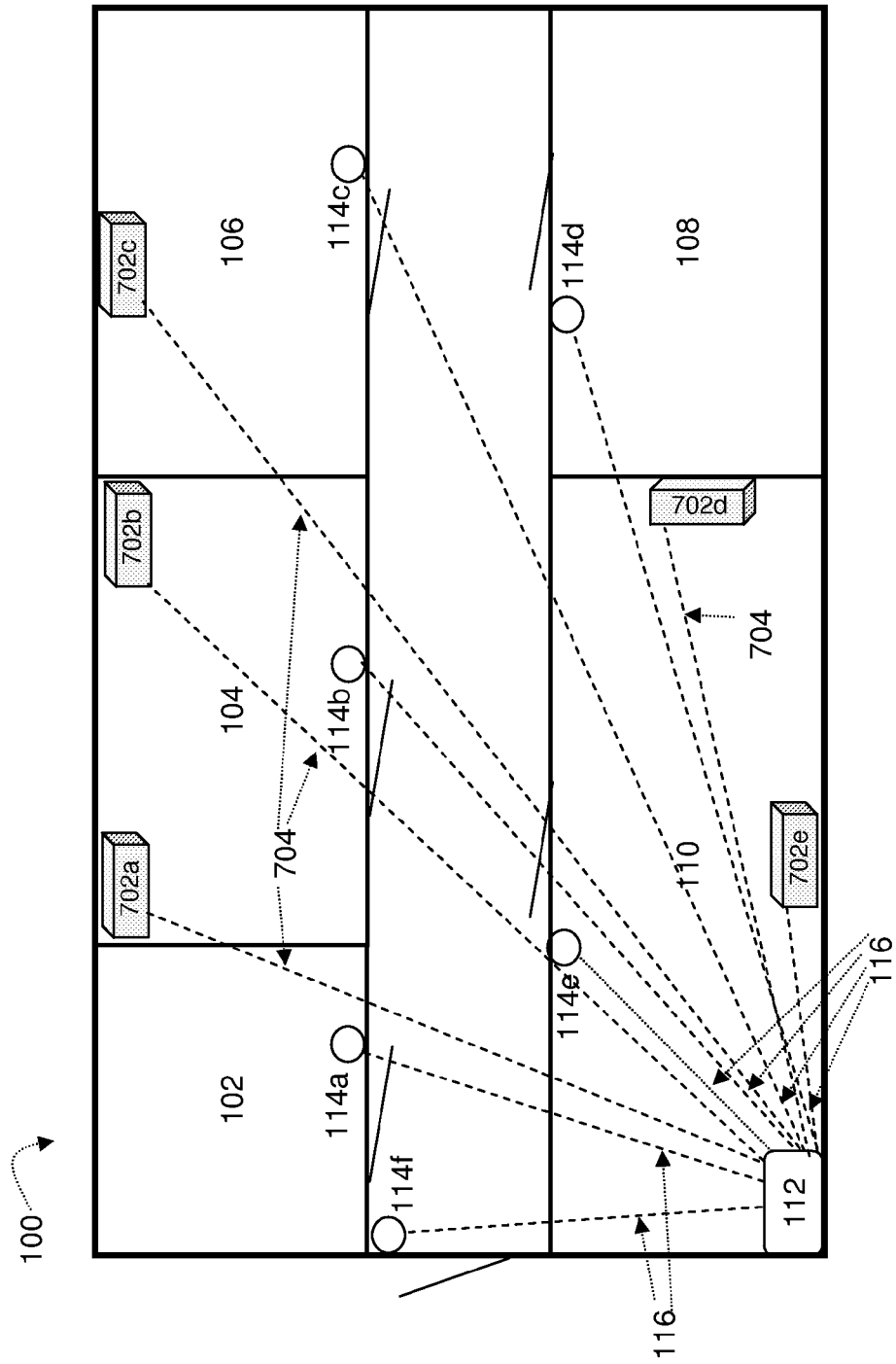
FIG. 1 illustrates an architecture of an office building with a security server, RFID readers, and a plurality of computer systems, according to an exemplary aspect of the present invention.

Referring now to the drawings, and more particularly to FIGS. 1-4, FIG. 1 shows an architecture of an office building with a security server, RFID readers, and a plurality of computer systems is shown. A security server 112, in combination with the computer systems 702a-702e, automatically adjusts the security level for a removable medium according to the security level of the data that is stored on said removable medium. The security level of data is configured within the security server and might be based on the name of files containing data. The security level of the data is related to the removable medium by the security server and used by the security server to allow or prohibit the transportation of said removable medium outside of an enclosure such as a room. When the transportation of a removable medium is prohibited, the security server sends an alert.

Each removable medium according to this invention includes the removable media passport including an RFID transponder containing a unique ID. That unique ID is also stored on the medium itself and can be read by a computer system 702a. Additionally RFID readers are installed in the office-building receiving the unique ID of removable medium devices if these are in range. The RFID readers are connected to a security server which processes the unique IDs in accordance to the location of the RFID reader.

FIG. 1 shows the security server 112 connected to computer system 702a-702e installed in office 100. Office building 100 includes multiple rooms (102, 104, 106, 108 and 110), RFID readers 114a-f, and the security server 112.

The RFID readers are mounted in the doorposts according to this embodiment. Security server 112 is connected to the RFID readers 114a-114f via connections 116. Connections 116 can be based on Ethernet or other network protocols and infrastructure according to related art. Via connection 116, the security server receives information from the RFID readers 114a-f about unique IDs passing by the RFID reader and associated with a removable storage media device and the unique ID of said RFID reader. Security server is also connected to computer systems 702a-702e via a separate connection 704 which might be a network based on Ethernet.

Network 704 and 116 might also be the same network. Computer system 702a-702e are used to store data on the removable medium.

Each computer system 702a-702e includes novel methods included in removable medium interface 203 and communication process 204 to communicate with the security server whenever data is written or deleted from a removable medium device.

Figure 2:
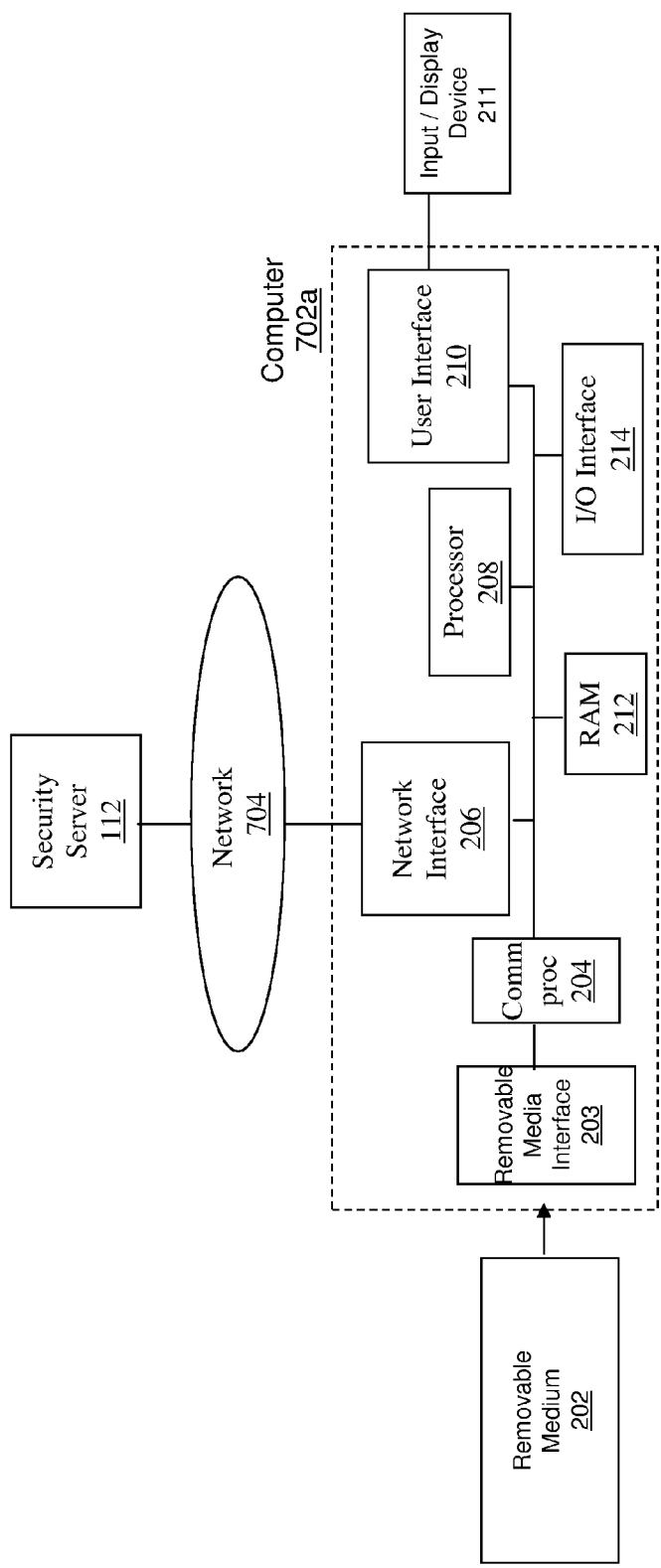
FIG. 2 illustrates a computer system and its setup with a security server, according to an exemplary aspect of the present invention.

FIG. 2 illustrates a computer system its setup with a security server; FIG. 2 shows the components of exemplary computer system 702a.

Computer system 702a includes related art components such as a network interface 206 connecting the computer system to the security server 112 via network 704, processor 208 running instructions, a user interface 210 allowing to the user to interact with computer system using input and screen device 211, a random access memory (RAM) 212 used to store data and instructions, and one or more input/output (IO) interfaces 214 allowing to connect other devices such as stationary disk devices or other networks.

Computer system 702a also includes a novel communication process 204 which communicates with the security server 112 via network interface 206 and network 704. Whenever a removable medium 202 is connected to computer system 702a—more precise to the removable medium interface 203—the communication process 204 reads the unique ID of the removable medium. Whenever data are written or deleted from the removable medium 202 connected to computer system 702a the communication process sends the list of data characteristics and the unique ID of said removable medium to the security server. Based on this information and the preconfigured security levels of the data, the security server includes a method to automatically adjust the security level for the removable medium, which is explained later in FIG. 3.

When referring to data the easiest way to describe it is by a file containing data. A file is denoted by a file name and other attributes such as the name of the user who created the file, date and time of file creation and modification, and file type. However, the term of the file data may also refer to collections of files such as directories or file systems. It may also refer to data that are not in a file but in data sets pertaining to a data base. In the preferred embodiment, data is being explained based on files denoted by a file name and other unique attributes.

The security level of data files is preconfigured in the security server 112 by an administrator potentially following the security guidelines of an enterprise. Security server 112 therefore maintains Table 1.

TABLE 1

Mapping file names to security level.

| File Name Pattern (11) | Security Level (12) |
| --- | --- |
| c:\projectx\* | Critical |
| c:\documents\* | Important |
| c:\temp\* | Uncritical |

Table 1 includes two columns: in column 11 the file name pattern is configured which essentially represents the file and directory names of files stored locally in computer 702a or on another storage device connected to computer 702a via I/O interface 114; in column 12 the security level is configured which is applicable to the file name pattern 11. In the preferred embodiment three security levels are defined whereby the highest level is "critical", the medium level is "important" and the lowest level is "uncritical". People skilled in the art will appreciate that further security levels might be applicable. File name pattern 11 are patterns which are matched against file names. A file name is characterized by the name of the mount-point, name of the directory or path and the actual name of the file. This name can be matches against a pattern whereby the pattern may include wildcards and therefore represent a group of files.

For example, the second row of Table 1 can be interpreted that all files stored in directory c:\projectx and in associated subdirectories of computer system 702a have a security level of "Critical". Likewise the third row of Table 1 says that all files stored in directory c:\documents and in associated subdirectories of computer system 702a have a security level of "important" and the fourth row of Table 1 says that all files stored in directory c:\temp and in associated subdirectories of computer system 702a have a security level of "uncritical."

In addition, security server 112 maintains a Table 2 that maps the file names 22 stored on removable media ID 24 and the associated security levels 26 which is derived from Table 1.

TABLE 2

Mapping of the file names to removable medium.

| File Name (22) | Removable Medium ID (24) | Security level (26) |
|---|---|---|
| c:\projectx\projectplan.txt | 123456789 | Critical |
| c:\documents\letter.doc | 123456789 | Important |
| c:\temp\log.out | 123456789 | Uncritical |
| c:\temp\junk.txt | 234567891 | Uncritical |

Table 2 includes three columns. The first column 22 specifies the name of the file stored on the removable medium. The second column 24 includes the unique ID of the removable medium and the third column 26 specifies the security level of the removable medium which is ultimately derived from the security level 12 of the file name pattern 11 in Table 1.

For example and referring to the second, third and fourth row of Table 2: on removable medium with the ID "123456789" the files c:\projectx\projectplan.txt, c:\documents\letter.doc and c:\temp\log.out are stored. The security level of this removable medium is "critical" because the c:\projectx\projectplan.txt has the highest security level according to Table 1. Removable medium "234567891" includes only one file from c:\temp\junk.txt which has security level "Uncritical".

This Table 2 is continuously updated whenever files are written or deleted from a removable medium which is further explained in process 300 of FIG. 3 which is explained later. Based on the security levels of the data files preconfigured in Table 1 of security server 112 the security level of a removable medium (column 26 of table 2) is adjusted (e.g., automatically adjusted) whenever data files are written or deleted from the removable medium. The security level of the removable medium is used to allow or prevent the transportation of said removable medium inside or outside of certain boundaries. Boundaries are represented by configurable security zones.

Figure 4:
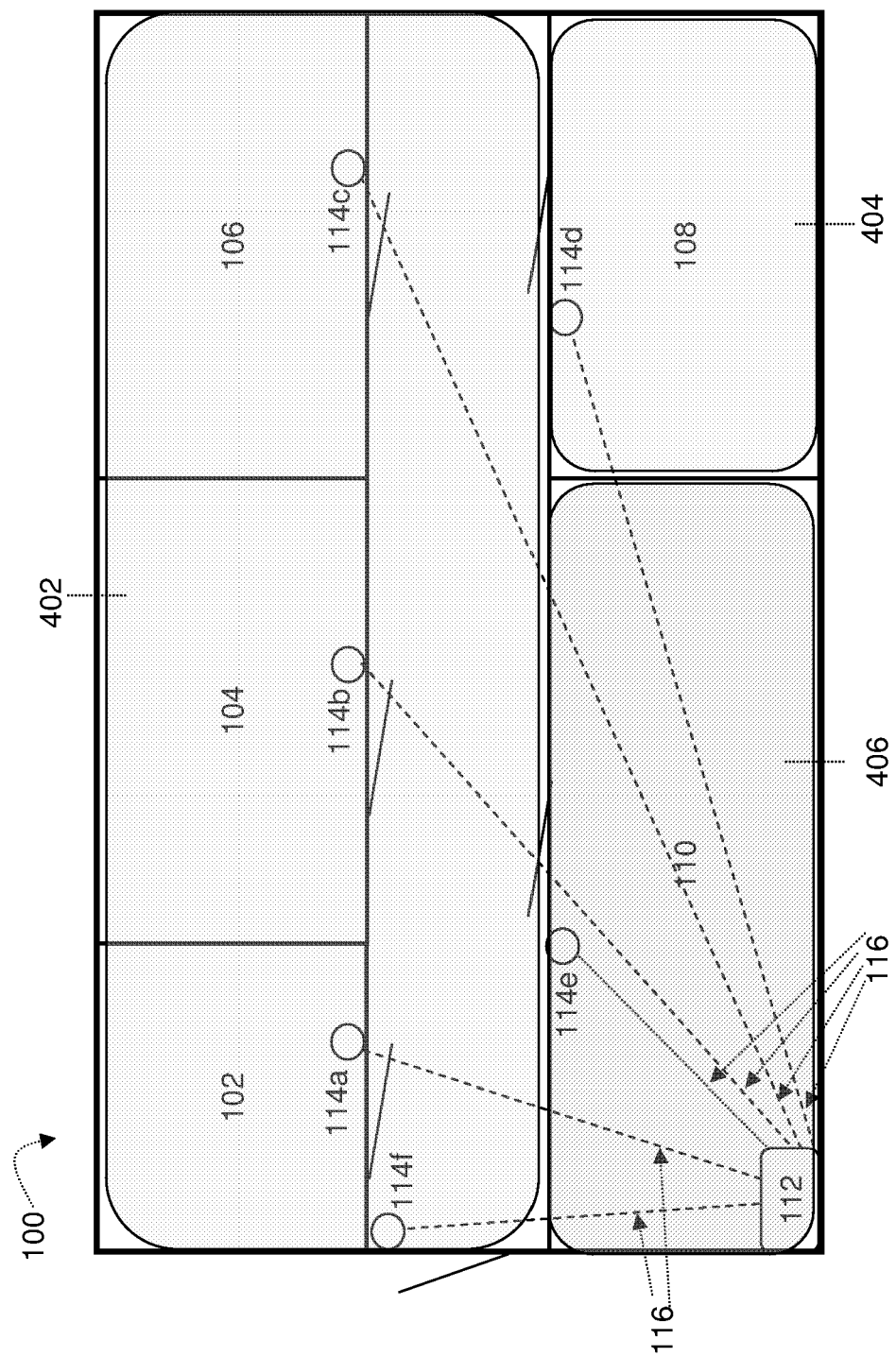
FIG. 4 illustrates an office building with configured security zones, according to an exemplary aspect of the present invention.

FIG. 4 illustrates an office building with configured security zones. According to the example in FIG. 4 the security zone 402 includes RFID reader 114a, 114b, 114c and 114f. Security zone 404 includes RFID reader 114d and security zone 406 includes RFID reader 114e.

Each security zone 402, 404 and 406 according to FIG. 4 has one predefined security level. Therefore security server 112 maintains table 3.

TABLE 3

Mapping of removable media security levels to security zones

| Unique ID (32) | Security Zone (34) | Security level (36) | RFID Readers (38) |
|---|---|---|---|
| 1234567890 | 402 | Critical | 314a, 314b, 314c, 314f |
| 2345678901 | 402, 406 | Important | 314a, 314b, 314c, 314f, 314e |
| 3456789012 | 402, 404, 406 | Uncritical | 314a, 314b, 314c, 314d, 314f, 314e |

Table 3 maps the removable medium denoted by its unique ID 32 to security zones 34 based on the security level (column 36) of the medium. The security level of a removable medium (column 36) which is automatically adjusted by process 300 based on the security level of the files stored on said medium is automatically mapped against a security zone. Thereby security zone 402 is configured for removable medium with security level "critical"; security zones 402 and 406 are configured for removable medium with security level "important" and security zones 402, 404 and 406 are configured for removable medium with security level "uncritical" Each security zone (column 34) includes a subset of RFID readers (column 38) whereby each RFID reader has a unique ID. Ultimately the security server can derive from table 3 in which zones a given removable medium is allowed and not allowed.

From Table 3 the security server can derive that removable medium with ID "1234567890" (column 32) has security level "Critical" (column 36) and access to zone 402 (column 34), removable medium with ID "2345678901" has security level "Important" and access to zones 402 and 406 and removable medium with ID "3456789012" has security level "Uncritical" and access to zone 402, 404 and 406.

Process 300 automatically adjusts the security level (column 36) of the removable medium (column 32) based on the highest security level of the files (column 26 in table 2) stored on it, and updates Table 3 automatically in steps 314 and 318. In step 314 the security level 36 of the removable medium ID 32 is increased and in step 318 the security level 36 of the removable medium ID 32 is decreased. Every time the security level 36 is changed for a removable medium 32, the security zone 34 is also changed accordingly.

Figure 3:
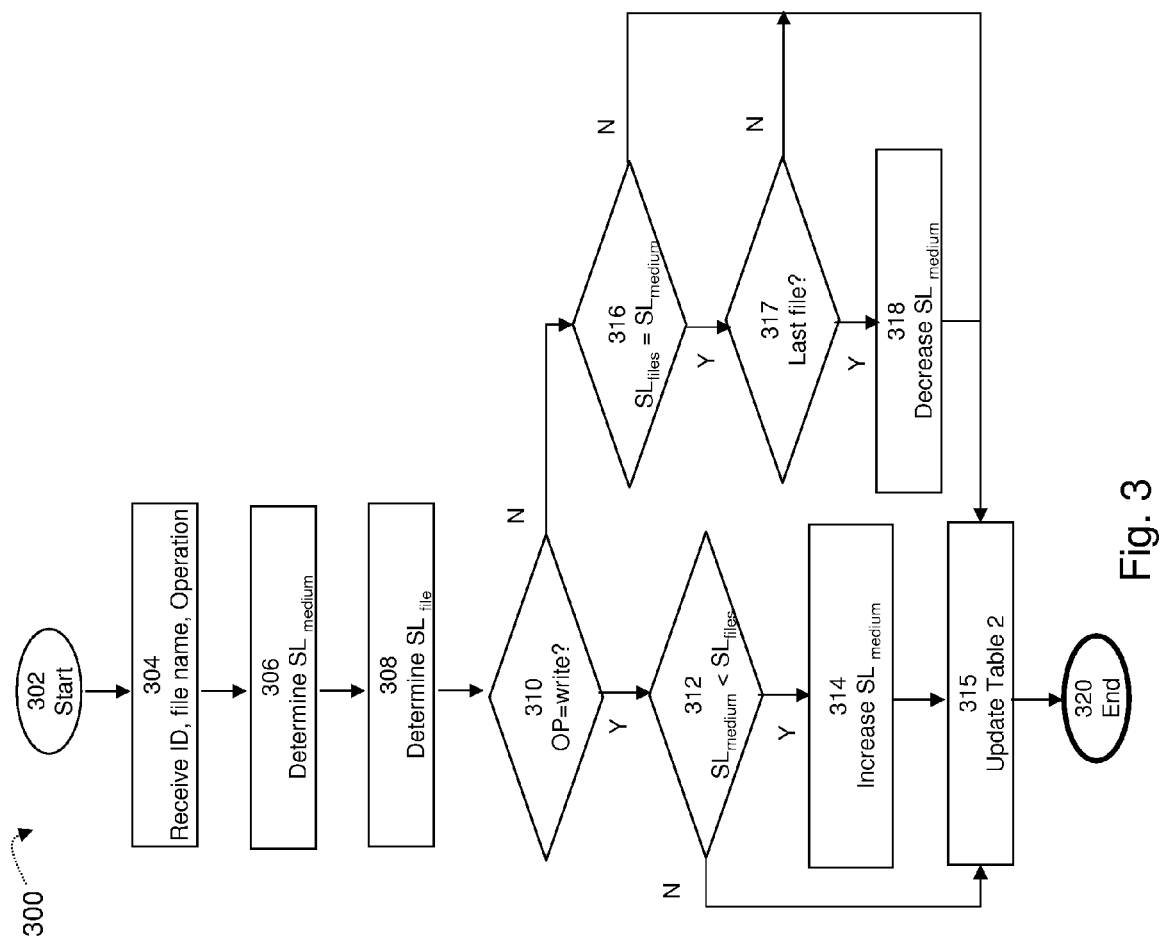
FIG. 3 illustrates an algorithm for adjusting a security level of a removable medium, according to an exemplary aspect of the present invention.

The associated method according to security server 112 and computer system 702a-702e is described in process 300 in FIG. 3.

FIG. 3 illustrates an algorithm for automatically adjust a security level of a removable medium.

Process 300 is invoked when a removable medium 202 is connected to a computer system 702a via removable medium interface 203 and when the user writes or deletes data on said removable medium via user interface 210.

Process 300 starts in step 302 and continues to step 304 where communication process 204 sends the unique ID of the removable medium 202, the name of the files being processed and the operation requested by the user to the security server 112.

In step 306 the process determines the current security level of the removable medium based on the unique ID using Table 2(column 24 for the unique ID and 26 for the security level). Alternatively, column 32 and 36 of Table 3 can be used to determine the current security level of the removable medium.

In step 308 the process determines the security level for the file names being processed using Table 1 where column 11 includes the file name pattern and 12 includes the security level. The file names obtained in step 304 is thereby matched against the name pattern. If a file cannot be matched to a name pattern then a default security level is applied. The default security level is set to "important" according to the preferred embodiment.

In step 310 the process checks if the operation requested by the user is a write operation. If the answer is yes the process continues to step 312.

In step 312 the process checks whether the security level of the removable medium ($SL_{medium}$), which was determined in step 306, is lower than the security level of the files ($SL_{files}$) to be written to the medium which was determined in step 308. If the answer in step 312 is "yes," indicating that the files to be written have a higher security level, then the process flows to step 314 where the security level for the removable media device is increased and set to the highest security level of the files being written. Thereby column 36 of Table 3 for that removable medium (column 32) is updated accordingly which also changes the zone (column 34) where said removable medium is allowed.

From step 314 the process flows to step 315 where Table 2 is updated with the by adding a new row for each file name (column 22) and the according security levels (column 26) stored on the removable medium (column 24).

If the answer in step 312 is "no," indicating that the security level of the removable medium is equal or higher than the security level of the files being written, the process flows to step 315 where the Table 2 is updated by adding a new row for each file name (column 22) and the according security level (column 26) stored on the removable medium (column 24).

If the answer in step 310 is "no," and the operation is not a write operation but a delete operation the process flows to step 316.

In step 316 the process checks whether the security level of the files being deleted are highest. The process thereby consults Table 2 to determine the highest security level (column 26) of the files (column 22) residing on removable medium (column 24). If the answer in step 316 is yes then the process flows to step 317.

In step 317 the process determines if the deletion of the files causes the security level of the removable medium to be decreased. This is the case if the files being deleted are the last files with the highest security level stored on said medium. The process thereby consults Table 2 again.

If the answer in step 317 is "yes," then the process flows to step 318, where the service level of the medium is decreased and set to the highest security level of the remaining files on said medium. Thereby column 36 of Table 3 for that removable medium (column 32) is updated accordingly which also changes the zone (column 34) where said removable medium is allowed. From step 318 the process flows to step 315 where Table 2 is updated. Thereby all rows matching the files name entries (column 22) which are deleted from said removable medium (column 24) are removed from Table 2.

If the answer in step 316 is "no," indicating that the files being deleted do not have the highest security level for that medium then the process flows to step 315 where Table 2 is updated. Thereby all rows matching the files name entries (column 22) which are deleted from said removable medium (column 24) are removed from Table 2.

If the answer is step 317 is "no," indicating that the deletion of the files from the removable medium does not cause a change to the security level because there are still files at the highest security level stored on the medium, then the process flows to step 315 where Table 2 is updated. Thereby all rows matching the files name entries (column 22) which are deleted from said removable medium (column 24) are removed from Table 2.

From step 315 the process flows to ending step 320.

Based on the automatic adjustment of security levels and zones to a removable medium via Table 1, Table 2, Table 3 and process 300, the security server is now able to detect security violations. A security violation is detected when a removable medium is transported outside a zone defined in Table 3. Subsequently the security server can issue alerts by different means, whether audible or visible.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method of adjusting a security level of a removable medium, comprising:

receiving a unique identification (ID) of a removable medium, a name of a file being processed, and a requested operation;

determining the security level of the removable medium;

determining a security level of the file being processed; and one of increasing and decreasing the security level of the removable medium based on the security level of the file being processed, wherein the one of increasing and decreasing the security level of the removable medium comprises:

checking the requested operation;

comparing the determined security level of the removable medium to the security level of the file being processed, if the requested operation comprises writing the file being processed to the removable medium;

increasing the security level of the removable medium if the determined level of the file being written to the removable medium is greater than the determined security level of the of the removable medium, and if the requested operation comprises writing the file to be processed to the removable medium;

comparing the determined security level of the file being processed to a security level of all other files stored in the removable medium, if the requested operation comprises deleting the file to be processed from the removable medium;

decreasing the security level of the removable medium if the determined security level of the file to be deleted is greater than the security level of all other files stored in the removable medium, if the requested operation comprises deleting the file to be processed from the removable medium;

updating a table mapping the security level of the removable medium to a security zone if the determined security level of the removable medium is one of increased and decreased; and allowing or preventing transportation of the removable medium inside or outside of a security zone.

* * * * *